US008830884B2

(12) United States Patent
Kitazoe et al.

(10) Patent No.: US 8,830,884 B2
(45) Date of Patent: Sep. 9, 2014

(54) TTI BUNDLING IN A RANDOM ACCESS PROCEDURE

(75) Inventors: Masato Kitazoe, Hachiouji (JP); Arnaud Meylan, Bois-Colombes (FR)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 12/542,551

(22) Filed: Aug. 17, 2009

(65) Prior Publication Data

US 2010/0067412 A1 Mar. 18, 2010

Related U.S. Application Data

(60) Provisional application No. 61/089,816, filed on Aug. 18, 2008.

(51) Int. Cl.
*H04L 5/14* (2006.01)
*H04W 72/00* (2009.01)
*H04L 1/18* (2006.01)
*H04W 28/06* (2009.01)

(52) U.S. Cl.
CPC .............. *H04W 28/06* (2013.01); *H04L 1/1887* (2013.01); *H04L 1/1812* (2013.01)
USPC ........................................................ 370/294

(58) Field of Classification Search
CPC .......... H04W 74/0833; H04W 74/008; H04W 74/006; H04W 74/08; H04W 72/1205; H04W 74/002; H04W 28/06; H04L 1/1812; H04L 1/1864; H04L 1/1887
USPC ......... 370/276, 294, 295, 310, 328, 329, 343, 370/345; 455/403, 422.1, 450
See application file for complete search history.

(56) References Cited

U.S. PATENT DOCUMENTS 7,876,739 B2 * 1/2011 Ahn et al. ...................... 370/343
2008/0101306 A1 * 5/2008 Bertrand et al. .............. 370/336

(Continued)

FOREIGN PATENT DOCUMENTS

JP 2010506490 A 2/2010
JP 2012502597 A 1/2012

(Continued)

OTHER PUBLICATIONS

Alcatel-Lucent: "RAN2 aspects of the solutions for Subframe Bundling" 3GPP Draft; R2-081446 Subframe Bundling RAN2 Issues, 3rd Generation Partnership Project (3GPP), Mobile Competence Centre; 650, Route Des Lucioles; F-06921 Sophia-Antipolis Cedex ; France, vol. RAN WG2, No. Shenzhen, China; Mar. 25, 2008, XP050139195 [retrieved on Mar. 25, 2008] the whole document.

(Continued)

*Primary Examiner* — Chi Pham
*Assistant Examiner* — Robert Lopata
(74) *Attorney, Agent, or Firm* — Dalei Dong

(57) ABSTRACT

Systems and methodologies are described that facilitate effectuating a random access procedure in a wireless communication environment. A random access preamble can be sent from an access terminal to a base station, and a random access response can be sent from the base station to the access terminal in response. The random access response can allocate resources to be utilized by the access terminal for a scheduled transmission (e.g., message 3, . . . ). Further, a plurality of Transmission Time Intervals (TTIs) can be bundled for the scheduled transmission. Moreover, a payload of the scheduled transmission can be transmitted to the base station from the access terminal within a common Transport Block (TB) using the bundled plurality of TTIs. According to an example, employment of TTI bundling can be controlled on a per network basis, per base station basis, or per access terminal basis.

42 Claims, 12 Drawing Sheets

(56) References Cited

U.S. PATENT DOCUMENTS

| | | | | |
|---|---|---|---|---|
| 2010/0002590 A1* | 1/2010 | Park et al. | ...................... | 370/241 |
| 2010/0034126 A1* | 2/2010 | Kitazoe et al. | ................ | 370/310 |
| 2010/0085956 A1* | 4/2010 | Ahn et al. | ..................... | 370/344 |
| 2010/0098010 A1* | 4/2010 | Kuo | .............................. | 370/329 |
| 2010/0111068 A1* | 5/2010 | Wu | ............................... | 370/345 |
| 2010/0275086 A1* | 10/2010 | Bergquist et al. | ............. | 714/748 |
| 2010/0331003 A1* | 12/2010 | Park et al. | ..................... | 455/450 |
| 2011/0032889 A1* | 2/2011 | Lee et al. | ....................... | 370/329 |

FOREIGN PATENT DOCUMENTS

| | | | |
|---|---|---|---|
| WO | WO2008041936 A1 | 4/2008 | |
| WO | 2009082303 A1 | 7/2009 | |
| WO | 2010030930 A1 | 3/2010 | |

OTHER PUBLICATIONS

Ericsson: "Evaluation of TTI-Bundling Alternatives" 3GPP Draft; R2-081465 Evaluation of TTI-Bundling Alternatives, 3rd Generation Partnership Project (3GPP), Mobile Competence Centre ; 650, Route Des Lucioles ; F-06921 Sophia-Antipolis Cedex ; France, vol. RAN WG2, No. Shenzhen, China; Mar. 25, 2008, XP050139209 [retrieved on Mar. 25, 2008] the whole document.

Ericsson: "Initial Random Access Procedure for E-UTRAN" 3rd Generation Partnership Project (3GPP); Technical Specification Group (TSG) Radio Access Network (RAN); Workinggroup 2 (WG2), XX, XX, vol. R2-062853, Oct. 9, 2005, pp. 1-6, XP003020362 p. 3, line 8, paragraph 3.2—line 12.

Ericsson: "Text Proposal for TTI bundling" 3GPP Draft; R2-081466 TTI-Bundling_MAC Text Proposal, 3rd Generation Partnership Project (3GPP), Mobile Competence Centre; 650, Route Des Lucioles; F-06921 Sophia-Antipolis Cedex ; France, vol. RAN WG2, No. Shenzhen, China; Mar. 25, 2008, XP050139210 [retrieved on Mar. 25, 2008] the whole document.

Ericsson: "Text Proposal for TTI bundling" 3GPP Draft; R2-082149 TTI-Bundling_MAC Text Proposal, 3rd Generation Partnership Project (3GPP), Mobile Competence Centre; 650, Route Des Lucioles; F-06921 Sophia-Antipolis Cedex; France, vol. RAN WG2, No. Kansas City, USA; Apr. 29, 2008, XP050139928 [retrieved on Apr. 29, 2008] the whole document.

International Search Report and Written Opinion—PCT/US2009/054187, International Search Authority—European Patent Office—Jan. 26, 2010.

ZTE: "TTI bundling impact on DRX Inactivity Timer" Apr. 29, 2008, 3GPP Draft; R2-082253, 3rd Generation Partnership Project (3GPP), Mobile Competence Centre; 650, Route Des Lucioles; F-06921 Sophia-Antipolis Cedex ; France , XP050140016 [retrieved on Apr. 29, 2008] the whole document.

Taiwan Search Report—TW098127750—TIPO—Nov. 5, 2012.

\* cited by examiner

TTI BUNDLING IN A RANDOM ACCESS PROCEDURE

CROSS-REFERENCE TO RELATED APPLICATIONS

This application claims the benefit of U.S. Provisional Patent Application Ser. No. 61/089,816 entitled "A METHOD AND APPARATUS FOR TTI BUNDLING IN A WIRELESS COMMUNICATION" which was filed Aug. 18, 2008. The entirety of the aforementioned application is herein incorporated by reference.

BACKGROUND

I. Field

The following description relates generally to wireless communications, and more particularly to bundling Transmission Time Intervals (TTIs) for use in a random access procedure effectuated in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ...). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

An access terminal can utilize a random access procedure to gain access to a system (e.g., to obtain allocation of a communications channel and/or associated resources, ...). For instance, the random access procedure can be used for initial access to the system, handover from a source base station to a target base station, and the like. Typically, an access terminal sends a random access preamble on the uplink to start the random access procedure. A base station can receive the random access preamble and respond with a random access response sent over the downlink. Based upon the random access response, the access terminal can send a scheduled transmission over the uplink to the base station. However, the access terminal oftentimes is uplink power limited, and thus, the payload size for the scheduled transmission that can be employed by the access terminal can be small. Accordingly, the access terminal typically sends the scheduled transmission as well as one or more additional uplink messages to provide information to the base station to enable forming the connection with the base station. Transmission of the additional uplink messages can delay the access terminal from connecting with the base station.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating effectuation of a random access procedure in a wireless communication environment. A random access preamble can be sent from an access terminal to a base station, and a random access response can be sent from the base station to the access terminal in response. The random access response can allocate resources to be utilized by the access terminal for a scheduled transmission (e.g., message 3, ...). Further, a plurality of Transmission Time Intervals (TTIs) can be bundled for the scheduled transmission. Moreover, a payload of the scheduled transmission can be transmitted to the base station from the access terminal within a common Transport Block (TB) using the bundled plurality of TTIs. According to an example, employment of TTI bundling can be controlled on a per network basis, per base station basis, or per access terminal basis.

According to related aspects, a method that facilitates performing random access in a wireless communication environment is described herein. The method can include transmitting a random access preamble to a base station. Further, the method can include receiving a random access response from the base station in response to the random access preamble. Moreover, the method can include bundling a plurality of Transmission Time Intervals (TTIs) for a scheduled transmission. The method can also include transmitting a payload of the scheduled transmission to the base station within a common Transport Block (TB) using the bundled plurality of TTIs.

Another aspect relates to a wireless communications apparatus. The wireless communications apparatus can include a memory that retains instructions related to sending a random access preamble to a base station, obtaining a random access response from the base station in response to the random access preamble, bundling a plurality of Transmission Time Intervals (TTIs) for a scheduled transmission, and sending the scheduled transmission to the base station utilizing the bundled plurality of TTIs. Further, the wireless communications apparatus can include a processor, coupled to the memory, configured to execute the instructions retained in the memory.

Yet another aspect relates to a wireless communications apparatus that enables performing random access in a wireless communication environment. The wireless communications apparatus can include means for detecting whether to bundle a plurality of Transmission Time Intervals (TTIs) for a scheduled transmission to a base station in a random access procedure. Moreover, the wireless communications apparatus can comprise means for bundling the plurality of TTIs. Further, the wireless communications apparatus can include means for sending the scheduled transmission via the bundled plurality of TTIs to the base station.

Still another aspect relates to a computer program product that can comprise a computer-readable medium. The computer-readable medium can include code for transmitting a random access preamble to a base station. Further, the computer-readable medium can comprise code for receiving a random access response from the base station in response to the random access preamble. Moreover, the computer-readable medium can include code for detecting whether to bundle a plurality of Transmission Time Intervals (TTIs) for a scheduled transmission. Additionally, the computer-readable medium can include code for bundling the plurality of TTIs for the scheduled transmission. The computer-readable medium can also include code for transmitting a payload of the scheduled transmission to the base station within a common Transport Block (TB) utilizing the bundled plurality of TTIs.

In accordance with another aspect, a wireless communications apparatus can include a processor, wherein the processor can be configured to send a random access preamble to a base station. Moreover, the processor can be configured to obtain a random access response from the base station in response to the random access preamble. The processor can further be configured to recognize whether to bundle a plurality of Transmission Time Intervals (TTIs) for a scheduled transmission based upon one or more of a predefined setting for a network, an indicator included in a broadcast message, an indicator included in the random access response, or an uplink bandwidth. Still yet, the processor can be configured to bundle the plurality of TTIs for the scheduled transmission. Further, the processor can be configured to send the scheduled transmission to the base station within a common Transport Block (TB) utilizing the bundled plurality of TTIs. The processor can also be configured to obtain a contention resolution message from the base station in response to the scheduled transmission.

According to other aspects, a method that facilitates effectuating a random access procedure in a wireless communication environment is described herein. The method can include receiving a random access preamble from an access terminal. The method can also include generating a random access response based upon the random access preamble. Further, the method can include transmitting the random access response to the access terminal. Moreover, the method can include receiving a scheduled transmission sent from the access terminal using a bundled plurality of Transmission Time Intervals (TTIs).

Another aspect relates to a wireless communications apparatus. The wireless communications apparatus can include a memory that retains instructions related to receiving a random access preamble from an access terminal, generating a random access response based upon the random access preamble, transmitting the random access response to the access terminal, and receiving a scheduled transmission sent from the access terminal using a bundled plurality of Transmission Time Intervals (TTIs). Further, the wireless communications apparatus can include a processor, coupled to the memory, configured to execute the instructions retained in the memory.

Yet another aspect relates to a wireless communications apparatus that enables managing random access in a wireless communication environment. The wireless communications apparatus can include means for controlling whether an access terminal bundles a plurality of Transmission Time Intervals (TTIs) for a scheduled transmission in a random access procedure. Moreover, the wireless communications apparatus can include means for receiving the scheduled transmission sent from the access terminal using the bundled plurality of TTIs.

Still another aspect relates to a computer program product that can comprise a computer-readable medium. The computer-readable medium can include code for managing whether an access terminal bundles a plurality of Transmission Time Intervals (TTIs) for a scheduled transmission in a random access procedure. Further, the computer-readable medium can include code for obtaining the scheduled transmission sent from the access terminal using the bundled plurality of TTIs.

In accordance with another aspect, a wireless communications apparatus can include a processor, wherein the processor can be configured to receive a random access preamble from an access terminal. Further, the processor can be configured to generate a random access response based upon the random access preamble. Moreover, the processor can be configured to transmit the random access response to the access terminal. The processor can also be configured to control whether the access terminal bundles a plurality of Transmission Time Intervals (TTIs) for a scheduled transmission. Additionally, the processor can be configured to receive the scheduled transmission sent from the access terminal using the bundled plurality of Transmission Time Intervals (TTIs).

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
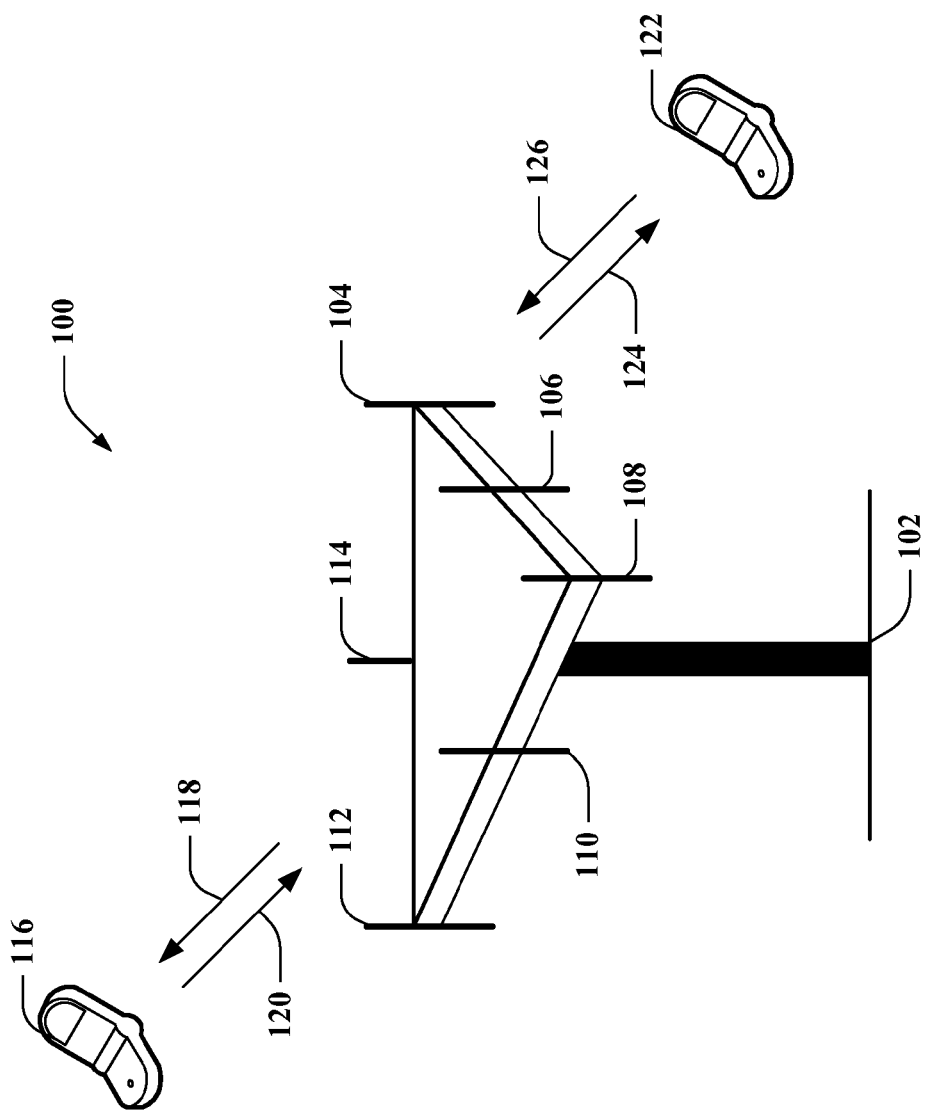
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

A random access procedure can be utilized in system 100. For instance, the random access procedure can be used by access terminals 116 and 122 for initial access, handover to and/or from base station 102, timing synchronization (e.g., re-entry from non-synchronized mode, . . . ), and the like. A random access procedure typically includes transmission of a random access preamble (e.g., message 1, . . . ) by an access terminal (e.g., access terminal 116, access terminal 122, . . . ) to base station 102 over the uplink, transmission of a random access response (e.g., message 2, . . . ) from base station 102 to the access terminal over the downlink based upon the received random access preamble, transmission of a scheduled transmission (e.g., message 3, . . . ) from the access terminal to base station 102 over the uplink where such scheduled transmission is granted by the random access response, and transmission of a contention resolution message (e.g., message 4, . . . ) from base station 102 to the access terminal over the downlink. As used herein, the term "message 3" refers to the scheduled transmission sent by the access terminal to base station 102 as granted by the random access response from base station 102.

Conventionally in wireless communication environments, a 1 ms Transmission Time Interval (TTI) is used to transmit and receive data. Hence, for the aforementioned random access procedure, a 1 ms TTI is commonly used for a particular random access channel (RACH) transmission; thus, a 1 ms TTI is typically utilized for a scheduled transmission (e.g., message 3, . . . ). Further, a 1 ms TTI can support a payload size of 80 bits. However, an access terminal oftentimes sends more than 80 bits of information in reply to a received random access response when setting up a connection with a base station through a random access procedure. Hence, an access terminal commonly sends an amount of information that exceeds a payload size of the scheduled transmission (e.g., message 3, . . . ), resulting in additional uplink transmissions being sent to base station 102 at later time(s) (e.g., subsequent to receipt of the contention resolution message from base station 102, . . . ). Accordingly, conventional techniques oftentimes yield delays in forming a connection when effectuating a random access procedure.

In contrast, system 100 utilizes TTI bundling to lessen an impact associated with conventional payload sizes for a scheduled transmission (e.g., alleviate the 80 bit limitation, . . . ). Each TTI, for instance, can correspond to a subframe included in a radio frame. For example, system 100 can enable a plurality of TTIs to be bundled for a scheduled transmission. Moreover, a payload of the scheduled transmission can be transmitted from an access terminal (e.g., access terminal 116, access terminal 122, . . . ) to base station 102 within a common Transport Block (TB) using the bundled plurality of TTIs. By bundling the TTIs to increase the uplink payload size for the scheduled transmission, speed of the connection establishment process can be increased.

Figure 2:
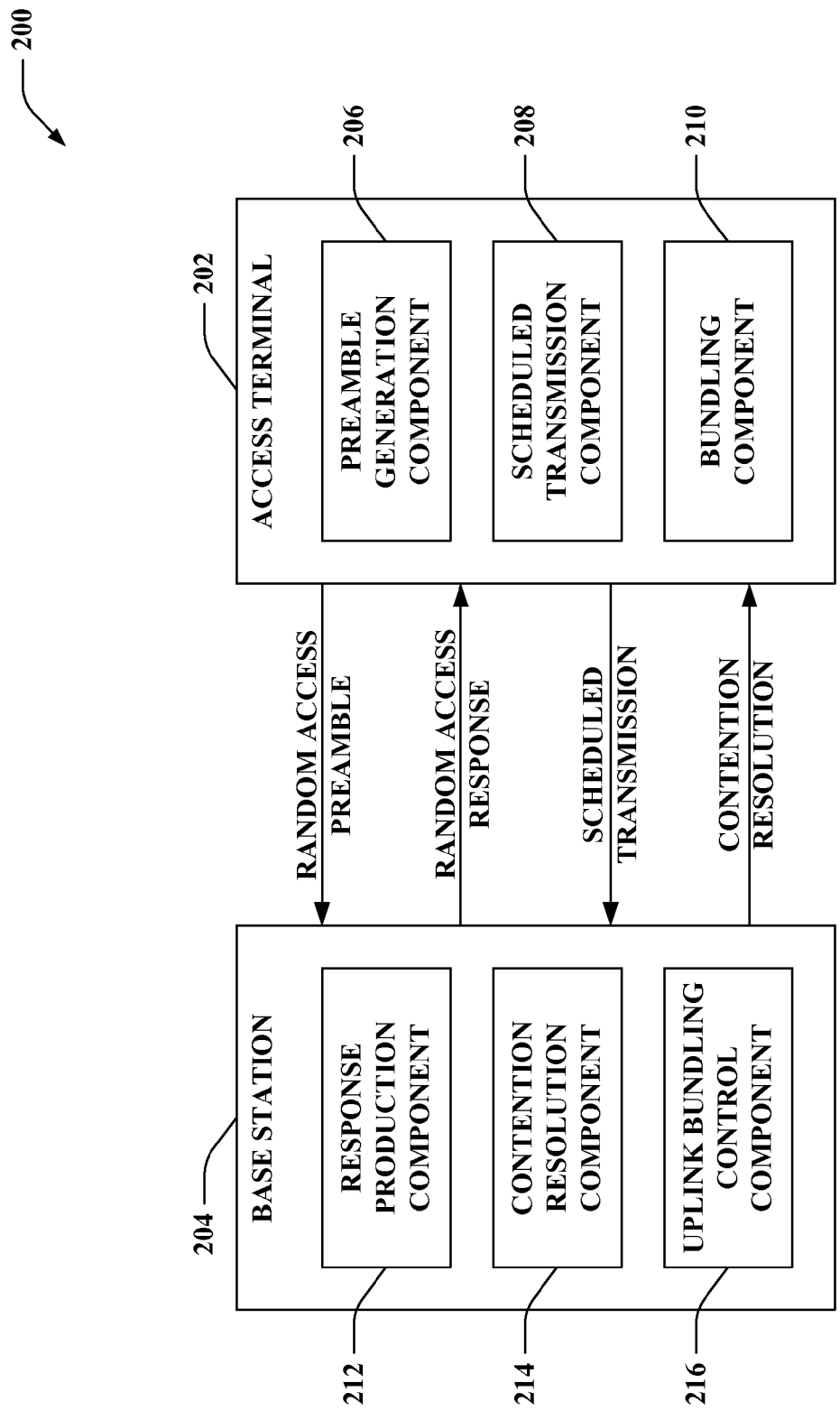
FIG. 2 is an illustration of an example system that utilizes Transmission Time Interval (TTI) bundling for a random access procedure in a wireless communication environment.

Now referring to FIG. 2, illustrated is a system 200 that utilizes Transmission Time Interval (TTI) bundling for a random access procedure in a wireless communication environment. System 200 includes an access terminal 202 that can transmit and/or receive information, signals, data, instructions, commands, bits, symbols, and the like. Access terminal 202 can communicate with a base station 204 via the forward link and/or reverse link. Base station 204 can transmit and/or receive information, signals, data, instructions, commands, bits, symbols, and the like. Although not shown, it is contemplated that system 200 can include any number of access terminals similar to access terminal 202 and/or any number of base stations similar to base station 204. Further, it is to be appreciated that system 200 can include various other components (not shown) associated with a core network such as, for instance, a Mobility Management Entity (MME). According to an illustration, system 200 can be a Long Term Evolution (LTE) based system; however, the claimed subject matter is not so limited.

Access terminal 202 and base station 204 can exchange messages as part of a random access procedure. To effectuate the random access procedure, access terminal 202 can include a preamble generation component 206, a scheduled transmission component 208, and a bundling component 210. Moreover, base station 204 can include a response production component 212, a contention resolution component 214, and an uplink bundling control component 216.

Preamble generation component 206 can yield a random access preamble (e.g., message 1, . . . ) that can be sent by access terminal 202 over an uplink to base station 204. Preamble generation component 206 can transmit the random access preamble to initiate the random access procedure. For instance, the random access procedure can be employed for initial access to a system, handover from a source base station to a target base station (e.g., base station 204, . . . ), and so forth. However, the claimed subject matter is not limited to the foregoing.

Preamble generation component 206 can transmit the random access preamble on the uplink to cause access terminal 202 to initiate connecting with base station 204 (e.g., if access terminal 202 has data to send, if access terminal 202 is paged, if access terminal 202 receives a handover command to transition from a source base station to base station 204 which is a target base station, . . . ). A random access preamble can also be referred to as an access request, an access signature, an access probe, a random access probe, a signature sequence, a Random Access Channel (RACH) signature sequence, etc. The random access preamble can include various types of information and can be sent in various manners. For instance, the random access preamble can be sent via a Physical Random Access Channel (PRACH); however, the claimed subject matter is not so limited.

Base station 204 can receive the random access preamble and response production component 212 can respond by sending a random access response (e.g., message 2, . . . ) to access terminal 202. A random access response can also be referred to as an access grant, an access response, etc. The random access response can carry various types of information and can be sent in various manners. For instance, the random access response can provide information related to timing alignment, an initial uplink grant, assignment of a temporary radio network temporary identifier (RNTI), and so forth. By way of example, the random access response yielded by response production component 212 can include an indication that identifies resources that can be used by access terminal 202 for a scheduled transmission (e.g., message 3, . . . ).

Access terminal 202 can receive the random access response sent by response production component 212 of base station 204. The random access response can grant uplink resources to be used by access terminal 202. Moreover, scheduled transmission component 208 of access terminal 202 can recognize the uplink resources granted to access terminal 202 in the random access response. Thereafter, scheduled transmission component 208 can yield a scheduled transmission (e.g., message 3, . . . ) that can be sent from access terminal 202 to base station 204. For instance, the scheduled transmission can convey an identity associated with access terminal 202; yet, the claimed subject matter is not limited to the foregoing. The scheduled transmission can be a first Uplink Shared Channel (UL-SCH) transmission from access terminal 202 to base station 204 as part of the random access procedure.

Base station 204 can receive the scheduled transmission sent from access terminal 202. In response, contention resolution component 214 can send a contention resolution message (e.g., message 4, . . . ) to access terminal 202. The contention resolution message can signify an end to the random access procedure. Thus, access terminal 202 can receive the contention resolution message and recognize an end of the contention based random access (e.g., contention is resolved, . . . ).

Moreover, bundling component 210 of access terminal 202 can bundle a plurality of TTIs for use by scheduled transmission component 208 in connection with transferring the scheduled transmission to base station 204. Bundling component 210, for instance, can recognize whether to bundle the plurality of TTIs. Further, when bundling component 210 identifies that TTI bundling is supported for the scheduled transmission, scheduled transmission component 208 can transmit a payload of the scheduled transmission to base station 204 within a common Transport Block (TB) employing the bundled plurality of TTIs.

Uplink bundling control component 216 can manage whether base station 204 supports TTI bundling for use in connection with a scheduled transmission (e.g., message 3, . . . ). For instance, uplink bundling control component 216 can control whether TTI bundling is supported on a per network basis, per base station basis, or per access terminal basis. Thus, according to an example, TTI bundling can be used across an LTE system by a set of base stations included in such system, which can be implemented by uplink bundling control component 216 and by similar uplink bundling control components (not shown) of disparate base stations (not shown) in such LTE system. By way of another example, uplink bundling control component 216 can direct whether TTI bundling is supported by base station 204 on a per base station basis (e.g., identify whether TTI bundling is to be utilized by a set of access terminals including access terminal 202 that attempt to connect to base station 204 via random access, differing base stations in a common system can similarly control whether or not TTI bundling is respectively supported thereby, . . . ). Pursuant to another example, uplink bundling control component 216 can manage whether a particular access terminal is to employ TTI bundling; thus, a first access terminal can be managed by uplink bundling control component 216 to use TTI bundling, while a second access terminal can be controlled by uplink bundling control component 216 to not employ TTI bundling. Additionally or alternatively, it is contemplated that bundling component 210 (or access terminal 202 generally) can control whether scheduled transmission component 208 utilizes TTI bundling. It is to be appreciated, however, that the claimed subject matter is not limited to the foregoing examples.

Bundling component 210 can recognize whether base station 204 supports TTI bundling and/or uplink bundling control component 216 can manage whether base station 204 supports TTI bundling. Thus, an understanding between access terminal 202 and base station 204 can exist concerning resources that can be utilized for the scheduled transmission (e.g., message 3, . . . ) sent by access terminal 202 (e.g., via scheduled transmission component 208, . . . ). Various examples that illustrate techniques by which the aforementioned understanding can be reached are described below; yet, the claimed subject matter contemplates yielding the above understanding in substantially any manner.

According to an example, TTI bundling can be utilized by all (or most) base stations in a network (e.g., LTE system, on a per network basis, . . . ). Thus, uplink bundling control component 216 can indicate to access terminal 202 (and/or any disparate access terminals (not shown)) to employ TTI bundling. Moreover, similar uplink bundling control component(s) of disparate base station(s) in the network can likewise indicate that TTI bundling is to be implemented. Further, bundling component 210 can identify that TTI bundling is to be employed based upon the received indication. It is further contemplated that base station(s) in the network need not indicate (e.g., over the air, . . . ) that TTI bundling is supported by all (or most) base station(s) across the network to access terminal(s). Rather, predefined instructions that specify that TTI bundling is utilized in the network can be provided to the access terminal(s), retained in memory associated with the access terminal(s), or the like; thus, bundling component 210 can employ the predefined instructions to bundle the plurality of TTIs when operating in the corresponding network.

Pursuant to another example, access terminal 202 can selectively bundle the plurality of TTIs as a function of uplink bandwidth. Thus, bundling component 210 can bundle the plurality of TTIs for utilization by scheduled transmission component 208 when the uplink bandwidth is less than or equal to a threshold value (e.g., 5 MHz, a threshold value greater than 5 MHz, a threshold value less than 5 MHz, . . . ). Further, bundling component 210 need not employ TTI bundling when the uplink threshold is greater than the threshold value. For instance, TTI bundling for the scheduled transmission can be utilized when an uplink bandwidth of 1.25 MHz, 3 MHz, or 5 MHz is employed, but need not use TTI bundling when an uplink bandwidth greater than 5 MHz is utilized; yet, the claimed subject matter is not so limited.

By way of a further example, base station 204 can support TTI bundling for access terminal(s) interacting therewith. Following this example, uplink bundling control component 216 can send a broadcast message that includes an indicator that distinguishes whether or not to employ TTI bundling (e.g., whether TTI bundling is supported can be indicated per base station, . . . ). For instance, uplink bundling control component 216 can transmit a flag in system information that identifies whether base station 204 supports TTI bundling for scheduled transmissions (e.g., message 3 transmissions, . . . ). The flag can be a 1 bit ON/OFF indication included in a System Information message; however, the claimed subject matter is not so limited. Thus, bundling component 210 can receive the broadcast message that includes the indicator that distinguishes whether to bundle the plurality of TTIs for the scheduled transmission. Moreover, bundling component 210 can recognize whether to bundle the plurality of TTIs based upon the indicator included in the broadcast message.

In accordance with another example, use of TTI bundling can be controlled per access terminal. Hence, uplink bundling control component 216 can cause response production component 212 to include an indicator in the random access response (e.g., message 2, . . . ) that specifies whether access terminal 202 should use TTI bundling for the corresponding scheduled transmission to be sent in response to the random access response. The random access response can allocate resources to be utilized by access terminal 202 for the scheduled transmission and can further identify whether TTI bundling is to be utilized by access terminal 202 (e.g., via a 1 bit ON/OFF indication included in the random access response, . . . ). Thus, bundling component 210 can evaluate the indicator included in the random access response that identifies whether to bundle the plurality of TTIs. Moreover, bundling component 210 can select whether to bundle the plurality of TTIs as a function of the indicator included in the random access response.

By way of further illustration, the plurality of TTIs can be bundled in a frequency division duplex (FDD) system; restrictions on whether TTI bundling can be used in a FDD system need not be applied since uplink resources are continuous in such system. Moreover, the plurality of TTIs can be bundled in a time division duplex (TDD) system that employs one of configuration 0, configuration 1, or configuration 6 (e.g., since the aforementioned TDD configurations can provide consecutive uplink subframes that can be bundled, . . . ). Thus, a subset of configurations in a TDD system can support employing TTI bundling.

TTI bundling implemented by bundling component 210 can allow access terminal 202 (e.g., scheduled transmission component 208, . . . ) to transmit for a longer duration of time. A plurality of consecutive TTIs can be bundled together by bundling component 210. Further, a single transport block can be coded and transmitted by scheduled transmission component 208 using the bundled set of consecutive TTIs. The bundled TTIs can be treated as a single resource where a single grant (e.g., Layer 1/Layer 2 (L1/L2) grant, included in the random access response, . . . ) received from base station 204 (e.g., response production component 212, . . . ) is used to schedule the transmission. Moreover, a single acknowledgement can be sent by base station 204 in response to the transmission; however, the claimed subject matter is not so limited. TTI bundling can provide time diversity, can increase resources that can be used for a scheduled transmission (e.g., message 3 transmission, . . . ), and can increase an effective power that access terminal 202 can use for sending the scheduled transmission (e.g., since the uplink power can be in different time domain resources, . . . ).

In order to accommodate a larger Transport Block (TB) size for the scheduled transmission (e.g., message 3, . . . ), even for small bandwidth systems, TTI bundling can enable raising the minimal TB size that can be leveraged for the scheduled transmission. For instance, 80 bits can be accommodated for the scheduled transmission without bundling (e.g., assuming a 1 ms TTI with 1.5 MHz uplink bandwidth, . . . ); thus, a TB (e.g., a resource upon which the scheduled transmission is sent, . . . ) with a relatively small size can cause various problems with respect to completion of signaling. In contrast, when system 200 employs TTI bundling, up to 320 bits can be accommodated for the scheduled transmission. More particularly, when TTI bundling is implemented, bundling component 210 can bundle together four TTIs and the four bundled TTIs can be used by scheduled transmission component 208 to send the scheduled transmission to base station 204. For instance, four consecutive TTIs can be bundled to increase resources that can be used by scheduled transmission component 208. Yet, it is to be appreciated that the claimed subject matter is not so limited as it is contemplated that any disparate number of TTIs (e.g., preconfigured number of TTIs, dynamically selected number of TTIs, . . . ) can be combined by bundling component 210. Thus, when bundling is used, it can be assumed that the scheduled transmission can support more than 80 bits. Further, while 320 bits for the scheduled transmission can be feasible when bundling is implemented, a subset of the bits need not be used. For instance, 200 bits can be used for the transmitting the scheduled transmission by scheduled transmission component 208 when bundling is employed; however, the claimed subject matter is not so limited.

By way of example, TTI bundling can be leveraged in a random access procedure used for establishing a connection to a network from access terminal 202 (e.g., initial access to the network, . . . ). Thus, access terminal 202 can establish a Radio Resource Control (RRC) connection with base station 204 (e.g., a serving base station, . . . ). The RRC connection is a radio level connection between access terminal 202 and base station 204. Moreover, as part of establishing such a network connection, Non-Access Stratum (NAS) signaling can be employed. NAS signaling can be used to form a connection between access terminal 202 and a network node such as a Mobility Management Entity (MME). Accordingly, a payload of the scheduled transmission sent using a plurality of bundled TTIs by scheduled transmission component 208 can carry information related to an RRC connection request and a NAS protocol data unit (PDU). For instance, the NAS PDU can be a NAS service request; however, the claimed subject matter is not so limited.

Pursuant to a further example, TTI bundling can be used in a random access procedure for connection reestablishment (e.g., RRC connection reestablishment procedure, . . . ). Hence, access terminal 202 can be connected to a source base station and can thereafter utilize the random access procedure to handoff to a target base station (e.g., base station 204, . . . ). Thus, for instance, a payload of the scheduled transmission sent utilizing a plurality of bundled TTIs by scheduled transmission component 208 can carry information related to a message authentication code integrity (MAC-I) for an RRC connection reestablishment message.

Figure 3:
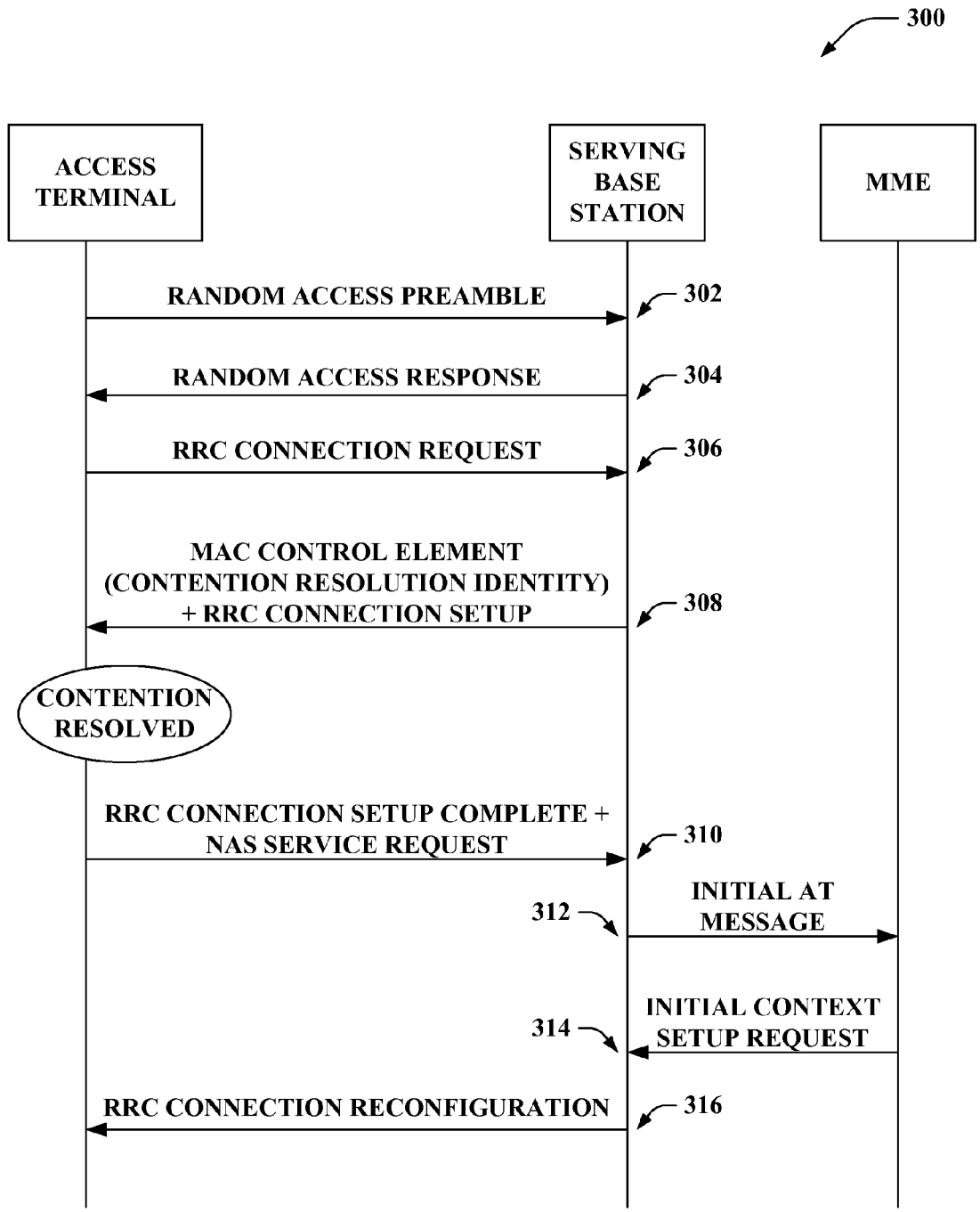
FIG. 3 is an illustration of an example call flow diagram for a random access procedure implemented without using TTI bundling.

With reference to FIG. 3, illustrated is an example call flow diagram 300 for a random access procedure implemented without using TTI bundling. The example call flow diagram 300 can be used to establish a connection to a network (e.g., initial access, . . . ). The random access procedure can be effectuated between an access terminal (e.g., access terminal 202 of FIG. 2, . . . ) and a serving base station (e.g., base station 204 of FIG. 2, . . . ). Moreover, the serving base station can further communicate with an MME (e.g., core network, . . . ).

At 302, the access terminal can transmit a random access preamble to the serving base station. The random access preamble can be referred to as message 1. At 304, the serving base station can transmit a random access response to the access terminal. The random access response can be referred to as message 2. The random access response can include an indication of resource(s) that can be used for transmission of an RRC connection request, which can be referred to as message 3 (e.g., scheduled transmission, . . . ). At 306, the access terminal can transmit the RRC connection request to the serving base station in accordance with a grant provided by the random access response. At 308, a contention resolution message can be transmitted from the serving base station to the access terminal. The contention resolution message can be referred to as message 4. The contention resolution message can include, for instance, a Medium Access Control (MAC) control element (e.g., contention resolution identity, . . . ) and an RRC connection setup message. Further, the contention resolution message can signify an end to the contention (e.g., contention can be resolved at such point, . . . ). However, due to a limited payload size of message 3, the access terminal can have additional information to send to the serving base station (e.g., information unable to be sent with the RRC connection request due to size constraints of the payload of message 3, . . . ). Thus, at 310, the access terminal can send an RRC connection setup complete message and a Non-Access Stratum (NAS) service request to the serving base station. At 312, the serving base station can transmit an initial access terminal message to the MME. At 314, the MME can send an initial context setup request to the serving base station. At 316, an RRC connection reconfiguration message can be sent from the serving base station to the access terminal.

When establishing a connection to a network, both Access Stratum (AS) and Non-Access Stratum (NAS) signaling can be employed. For instance, NAS signaling can be used to form a connection between the access terminal and the core network (e.g., the MME, disparate network node(s), . . . ), while AS signaling can be utilized to form a connection between the access terminal and the serving base station. According to the illustrated example, since TTI bundling is not employed, a size of a scheduled transmission (e.g., message 3, associated with the RRC connection request, . . . ) can be limited. Thus, the access terminal can send the RRC connection request at 306 without a NAS protocol data unit (PDU) (e.g., NAS service request, . . . ). Rather, the access terminal can await receipt of the RRC connection setup message at 308, which can indicate to the access terminal that a subsequent uplink transmission can be sent to the serving base station. Further, based upon the indication included in the RRC connection setup message, the access terminal can send the NAS PDU (e.g., NAS service request, . . . ) and/or the RRC connection setup complete message in the subsequent uplink transmission. Hence, two (or more) separate messages can be sent from the access terminal to the serving base station as a result of the limited size of the payload of the scheduled transmission (e.g., message 3, . . . ). Moreover, the serving base station utilizes the NAS PDU (e.g., NAS service request, . . . ) to initiate a connection with the MME (e.g., core network, . . . ); thus, since transmission of the NAS PDU is delayed (e.g., until a transmission later than message 3, . . . ), forming the connection to the core network can be delayed. Further, the limited size of the payload of the scheduled transmission can cause problems related to how to differentiate 40 bits of a Temporary Mobile Station Identity (TMSI)/random ID in the RRC connection request message.

Figure 4:
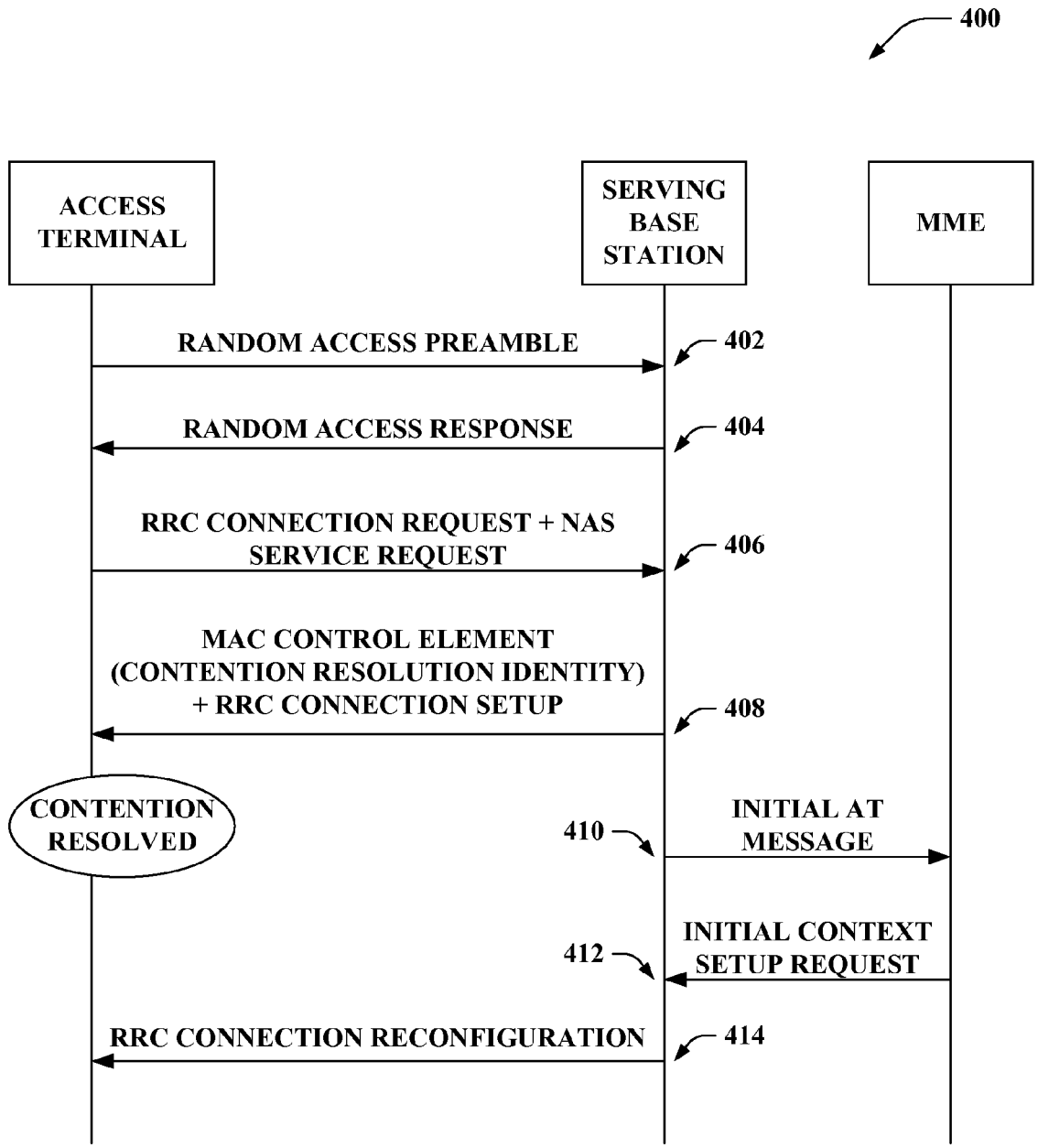
FIG. 4 is an illustration of an example call flow diagram for a random access procedure that includes utilizing TTI bundling.

Turning to FIG. 4, illustrated is an example call flow diagram 400 for a random access procedure that includes utilizing TTI bundling. Similarly to the example shown in FIG. 3, the example call flow diagram 400 can correspond to establishing a connection to a network (e.g., initial access, . . . ); yet, in contrast to the aforementioned example of FIG. 3, TTI bundling can be leveraged in the example depicted in the call flow diagram 400.

At 402, the access terminal can transmit a random access preamble to the serving base station. At 404, the serving base station can transmit a random access response to the access terminal. At 406, the access terminal can transmit an RRC connection request and a NAS PDU (e.g., NAS service request, . . . ). The RRC connection request can be sent with the NAS PDU (e.g., NAS service request, . . . ) utilizing a bundled plurality of TTIs (e.g., for message 3, . . . ). The RRC connection request and the NAS PDU (e.g., NAS service request, . . . ) can be sent together since a payload of message 3 can be increased when TTI bundling is utilized as described herein. Moreover, the serving base station can utilize information provided with the NAS PDU (e.g., NAS service request, . . . ) to trigger establishing a connection with the MME. Thus, a separate transmission carrying the NAS PDU need not be employed within the RRC connection establishment procedure when TTI bundling is implemented, and establishing a connection with a core network can begin with less delay as compared to techniques that fail to leverage TTI bundling for message 3.

Further, at 408, a contention resolution message can be sent from the serving base station to the access terminal (e.g., to end contention, ...). For instance, the contention resolution message can include a MAC control element (e.g., contention resolution identity, ...) and an RRC connection setup message. At 410, the serving base station can send an initial access terminal message to the MME (e.g., without waiting to obtain an uplink transmission from the access terminal subsequent to message 3, ...). At 412, the MME can transmit an initial context setup request to the serving base station. At 414, the serving base station can send an RRC connection reconfiguration message to the access terminal.

Figure 5:
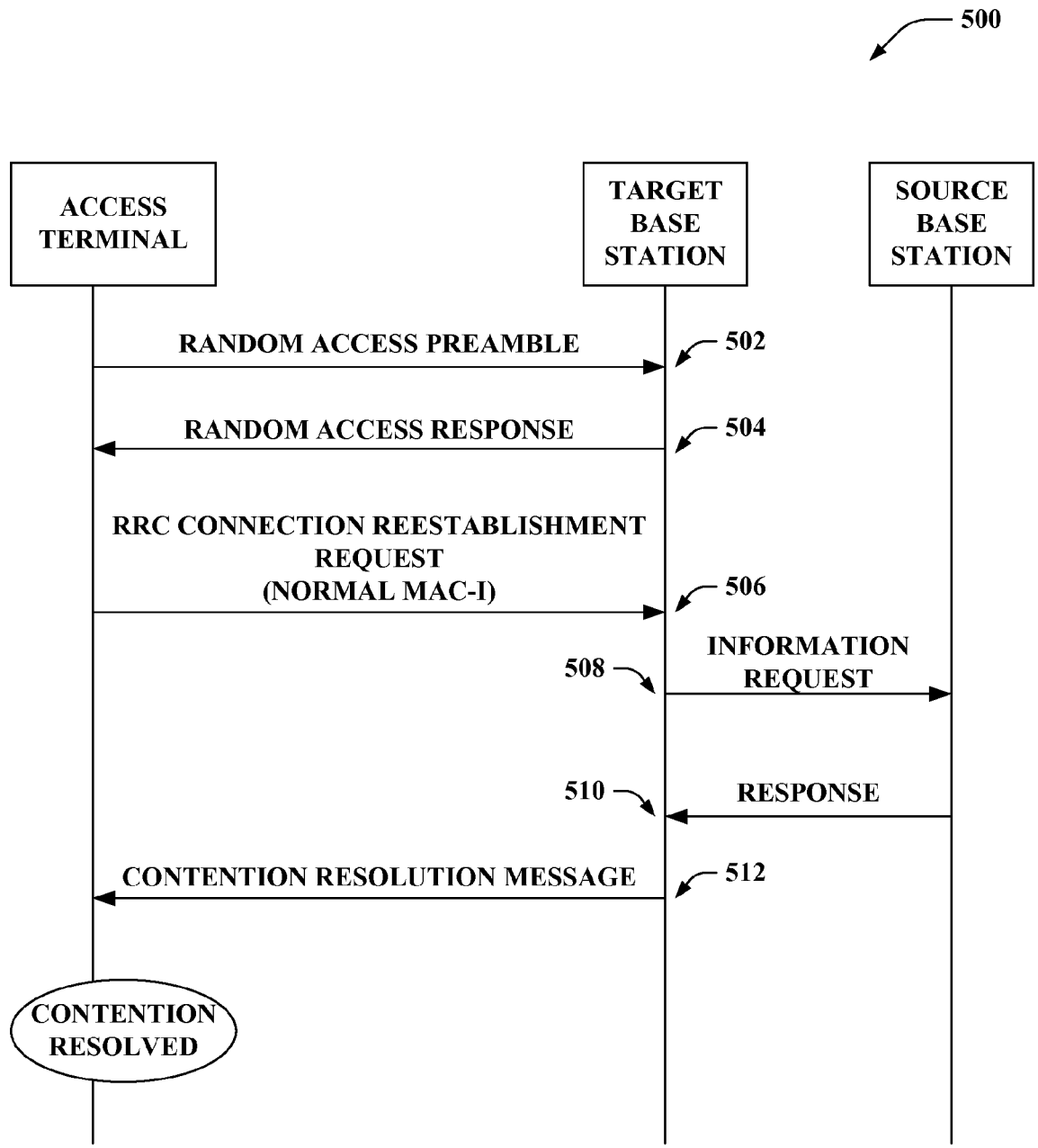
FIG. 5 is an illustration of an example call flow diagram of a random access procedure utilized for RRC connection reestablishment.

Now referring to FIG. 5, illustrated is an example call flow diagram 500 of a random access procedure utilized for RRC connection reestablishment. The call flow diagram 500 depicts an example where TTI bundling is implemented. The random access procedure can be effectuated between an access terminal (e.g., access terminal 202 of FIG. 2, ...) and a target base station (e.g., base station 204 of FIG. 2, ...) to which the access terminal is initiating handing off. Moreover, the target base station can further communicate with a source base station (e.g., the access terminal can be handing off from the source base station, ...). NAS signaling need not be effectuated in connection with RRC connection reestablishment.

At 502, a random access preamble can be transmitted from the access terminal to the target base station. At 504, a random access response can be sent from the target base station to the access terminal. At 506, an RRC connection reestablishment request (e.g., message 3, scheduled transmission, ...) can be sent from the access terminal to the target base station. The RRC connection reestablishment request can carry a normal Message Authentication Code Integrity (MAC-I). The RRC connection reestablishment request can be transmitted using a plurality of bundled TTIs. In contrast, if a single TTI is used for message 3, then a short MAC-I (e.g., 16 bits, ...) rather than a normal MAC-I (e.g., 32 bits, ...) can be encoded in the RRC connection reestablishment request. Thus, in the depicted example, TTI bundling can allow for increasing the size of message 3. By increasing the size of message 3, a normal MAC-I can be provided by the access terminal to the target base station rather than a short (e.g., cut, ...) MAC-I. At 508, the target base station can send an information request to the source base station. At 510, the source base station can transmit a response to the information request to the target base station. At 512, the target base station can send a contention resolution message to the access terminal.

Figure 6:
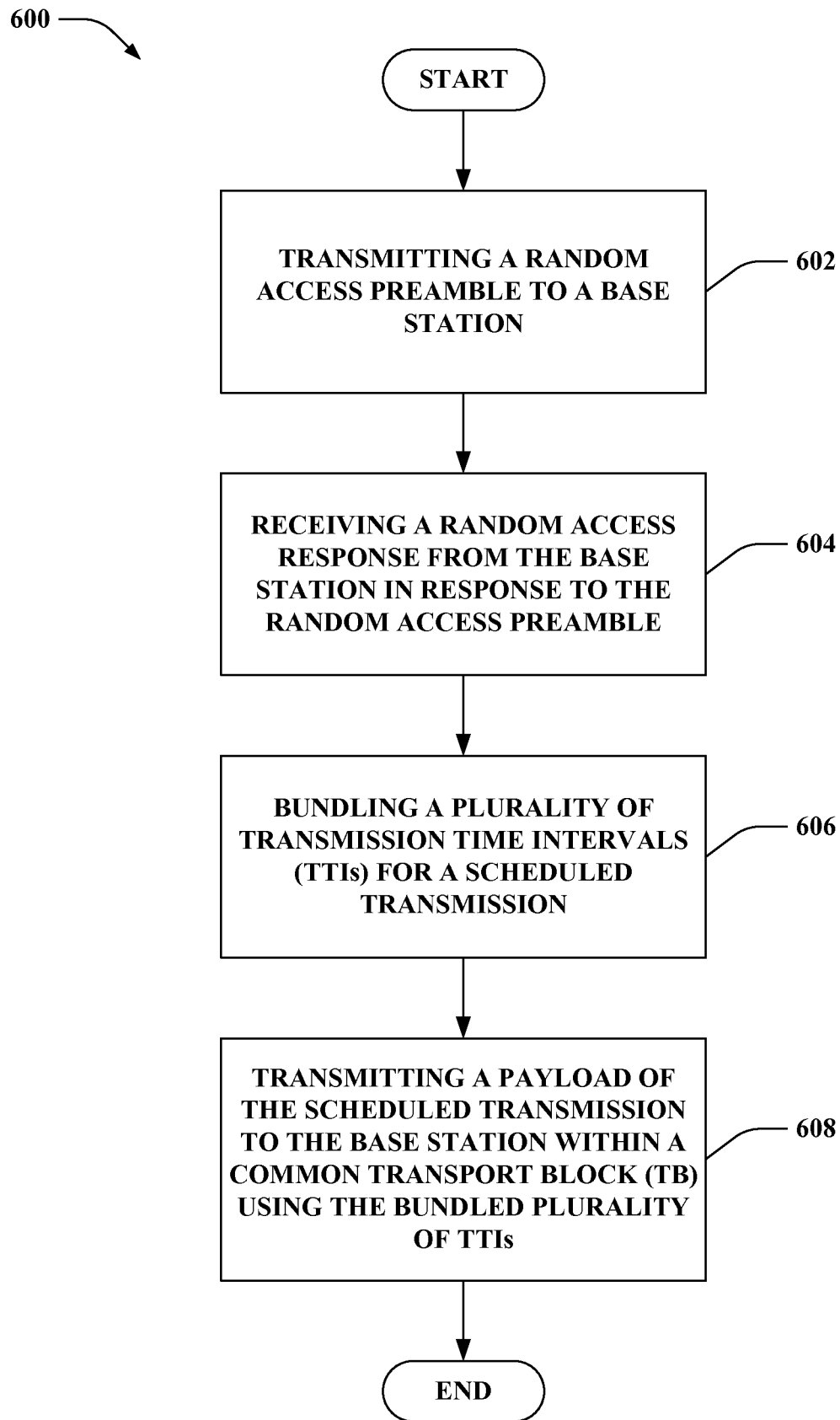
FIG. 6 is an illustration of an example methodology that facilitates performing random access in a wireless communication environment.
Figure 7:
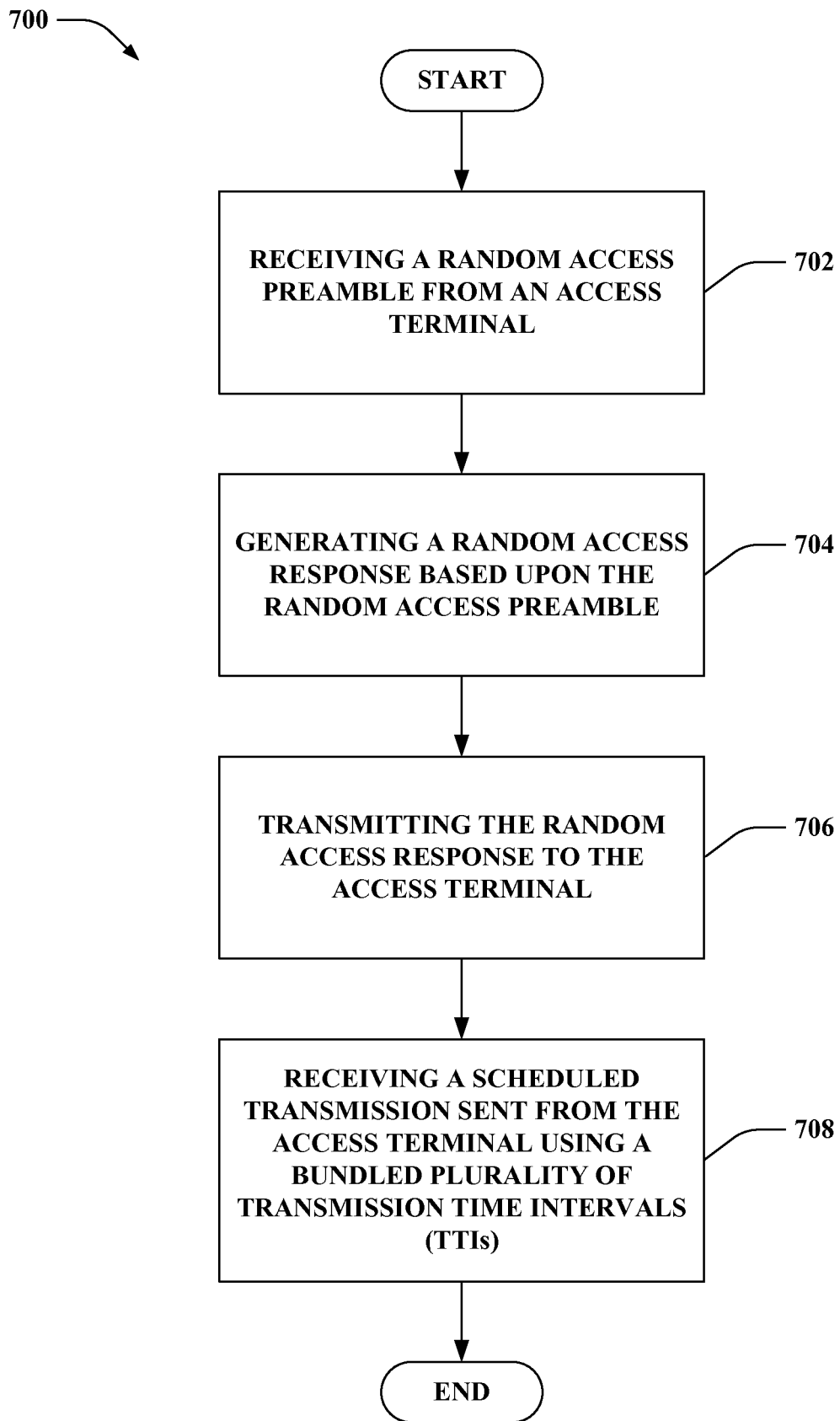
FIG. 7 is an illustration of an example methodology that facilitates effectuating a random access procedure in a wireless communication environment.

Referring to FIGS. 6-7, methodologies relating to employing TTI bundling in a random access procedure in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that facilitates performing random access in a wireless communication environment. At 602, a random access preamble can be transmitted to a base station. The random access preamble can be transmitted from an access terminal. At 604, a random access response can be received from the base station in response to the random access preamble.

At 606, a plurality of Transmission Time Intervals (TTIs) can be bundled for a scheduled transmission. Further, the access terminal can identify whether to bundle the plurality of TTIs. According to an example, the plurality of TTIs can be predefined to be bundled (e.g., scheduled transmissions sent in a network can utilize TTI bundling, bundling can be controlled on a per network basis, ...). By way of another example, the plurality of TTIs can be selectively bundled as a function of uplink bandwidth. Thus, following this example, the plurality of TTIs can be bundled when the uplink bandwidth is equal to or less than a threshold value (e.g., 5 MHz, ...). Pursuant to a further example, a broadcast message that includes an indicator that distinguishes whether to bundle the plurality of TTIs can be received from the base station; hence, the access terminal can recognize whether to bundle the plurality of TTIs based upon the indicator included in the broadcast message. For instance, the broadcast message can be a System Information message transmitted by the base station (e.g., bundling can be controlled on a per base station basis, ...). In accordance with another example, an indicator included in the random access response that identifies whether to bundle the plurality of TTIs can be evaluated. Following this example, the access terminal can select whether to bundle the plurality of TTIs as a function of the indicator included in the random access response (e.g., bundling can be managed on a per access terminal basis, ...). Further, the plurality of TTIs can be bundled in a frequency division duplex (FDD) system. Moreover, the plurality of TTIs can be bundled in a time division duplex (TDD) system that employs configuration 0, configuration 1, or configuration 6.

At 608, a payload of the scheduled transmission can be transmitted to the base station within a common Transport Block (TB) using the bundled plurality of TTIs. For example, the payload of the scheduled transmission can include information related to a Radio Resource Control (RRC) connection request and a Non-Access Stratum (NAS) protocol data unit (PDU) (e.g., NAS service request, ...). According to another example, the payload of the scheduled transmission can include information related to a Message Authentication Code Integrity (MAC-I) for a Radio Resource Control (RRC) connection reestablishment message. Moreover, a contention resolution message can be received from the base station in response to the scheduled transmission.

Now turning to FIG. 7, illustrated is a methodology 700 that facilitates effectuating a random access procedure in a wireless communication environment. At 702, a random access preamble can be received from an access terminal. At 704, a random access response can be generated based upon the random access preamble. For instance, the random access response can include an indication that specifies resources to be used by the access terminal for a scheduled transmission. By way of further example, the random access response can include an indicator that controls whether the access terminal bundles a plurality of Transmission Time Intervals (TTIs) for use in connection with the scheduled transmission. In accordance with another example, a broadcast message (e.g., System Information message, ...) that includes an indicator that manages whether TTI bundling is employed can be sent. By way of other examples, use of TTI bundling can be predefined or controlled based upon uplink bandwidth. At 706, the random access response can be transmitted to the access terminal.

At 708, a scheduled transmission sent from the access terminal using a bundled plurality of Transmission Time Intervals (TTIs) can be received. The scheduled transmission sent using the bundled plurality of TTIs, for example, can include information related to a Radio Resource Control (RRC) connection request and a Non-Access Stratum (NAS) protocol data unit (PDU) (e.g., NAS service request, . . . ). Following this example, an initial access terminal message can be sent to a Mobility Management Entity (MME) based upon the NAS PDU prior to receipt of a subsequent uplink message after the scheduled transmission from the access terminal. According to another example, the scheduled transmission sent using the bundled plurality of TTIs can include information related to a Message Authentication Code Integrity (MAC-I) for a Radio Resource Control (RRC) connection reestablishment message. Pursuant to this example, a normal MAC-I can be obtained from the access terminal rather than a short MAC-I. Moreover, following this example, an information request can be sent to a source base station based upon the RRC connection reestablishment message prior to receipt of a subsequent uplink message after the scheduled transmission from the access terminal. Further, a contention resolution message can be sent to the access terminal, for instance.

It will be appreciated that, in accordance with one or more aspects described herein, inferences can be made regarding using a plurality of bundled TTIs for a scheduled transmission (e.g., message 3, . . . ) of a random access procedure in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
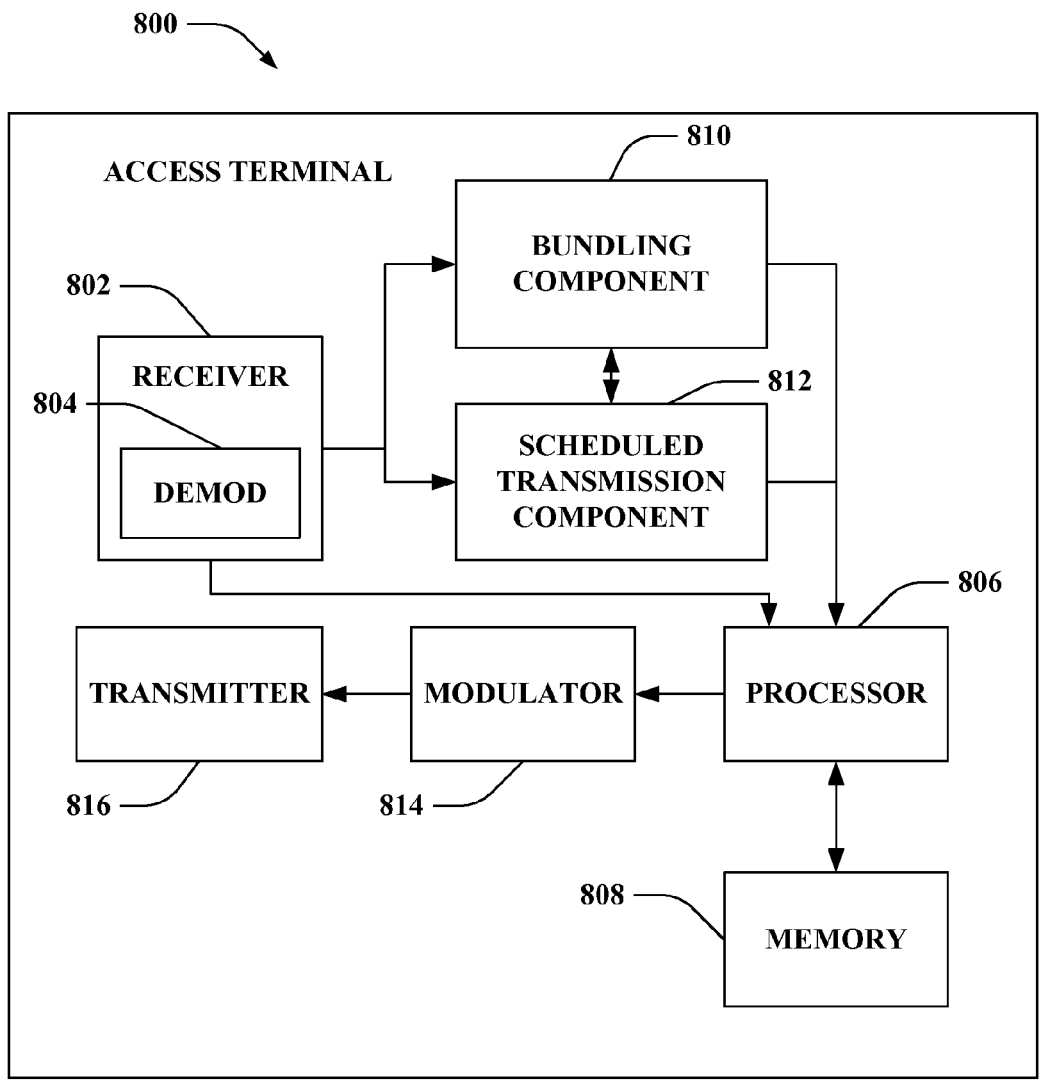
FIG. 8 is an illustration of an example access terminal that utilizes TTI bundling for sending a scheduled transmission (e.g., message 3, . . . ) of a random access procedure in a wireless communication system.

FIG. 8 is an illustration of an access terminal 800 that utilizes TTI bundling for sending a scheduled transmission (e.g., message 3, . . . ) of a random access procedure in a wireless communication system. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, and any other suitable information related to performing the various actions and functions set forth herein. Memory 808, for instance, can store protocols and/or algorithms associated with recognizing whether to bundle a plurality of TTIs for a scheduled transmission to be sent as part of a random access procedure, bundling the plurality of TTIs for the scheduled transmission, transmitting the scheduled transmission (e.g., to a base station, . . . ) using the bundled plurality of TTIs, and the like.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can be operatively coupled to a bundling component 810 and/or a scheduled transmission component 812. Bundling component 810 can be substantially similar to bundling component 210 of FIG. 2 and/or scheduled transmission component 812 can be substantially similar to scheduled transmission component 208 of FIG. 2. Bundling component 810 can recognize whether to employ TTI bundling for a scheduled transmission. Moreover, bundling component 810 can bundle a plurality of TTIs when such bundling is to be employed. Further, scheduled transmission component 208 can transmit a scheduled transmission (e.g., message 3, . . . ) using the bundled plurality of TTIs. Although not shown, it is to be appreciated that access terminal 800 can further include a preamble generation component, which can be substantially similar to preamble generation component 206 of FIG. 2. Access terminal 800 still further comprises a modulator 814 and a transmitter 816 that transmits data, signals, etc. to a base station. Although depicted as being separate from the processor 806, it is to be appreciated that bundling component 810, scheduled transmission component 812 and/or modulator 814 can be part of processor 806 or a number of processors (not shown).

Figure 9:
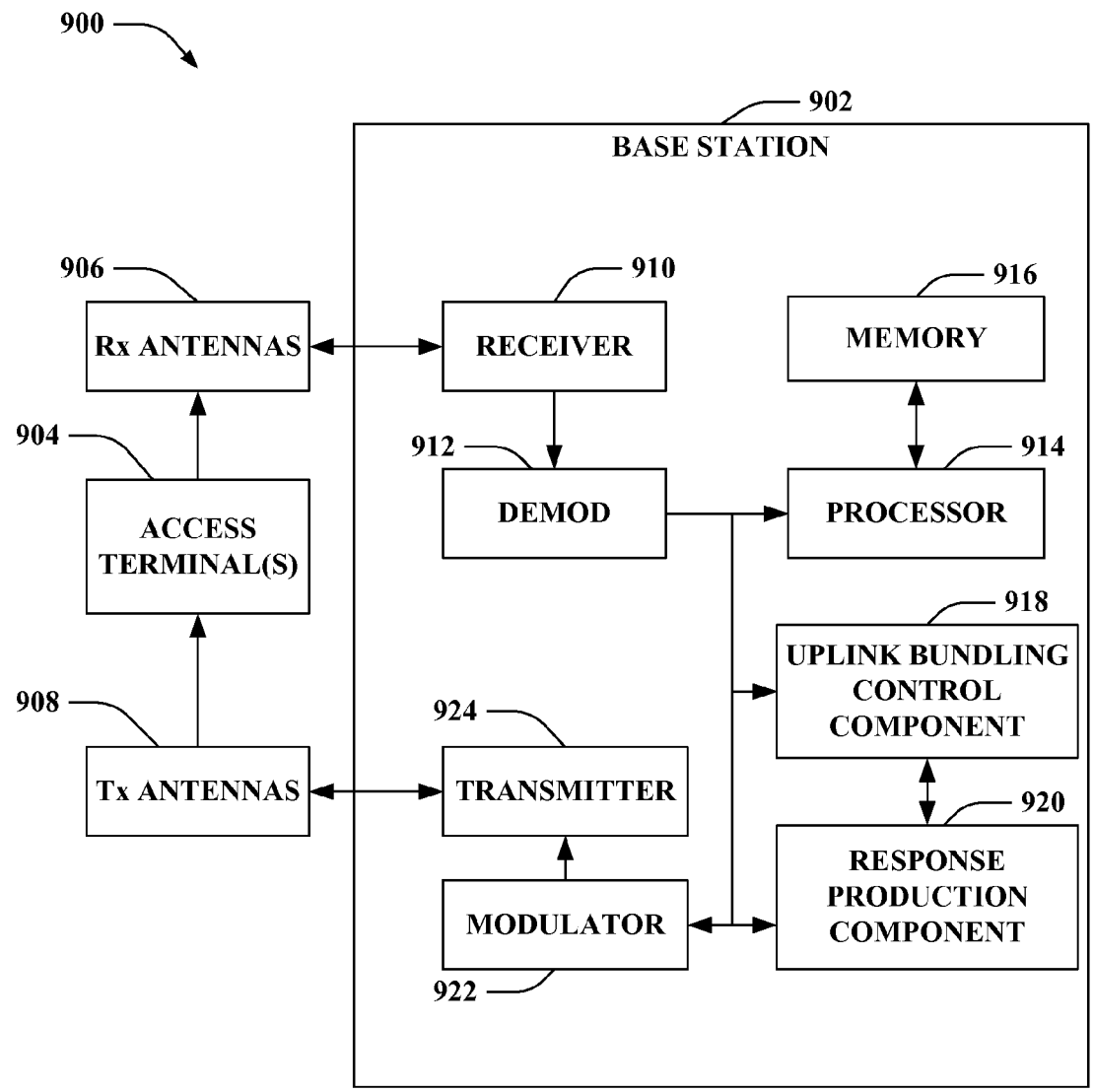
FIG. 9 is an illustration of an example system that manages TTI bundling in connection with random access in a wireless communication environment.

FIG. 9 is an illustration of a system 900 that manages TTI bundling in connection with random access in a wireless communication environment. System 900 comprises a base station 902 (e.g., access point, . . . ) with a receiver 910 that receives signal(s) from one or more access terminals 904 through a plurality of receive antennas 906, and a transmitter 924 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from access terminal(s) 904 and/or any other suitable information related to performing the various actions and functions set forth herein. Processor 914 is further coupled to an uplink bundling control component 918 and/or a response production component 920. Uplink bundling control component 918 can be substantially similar to uplink bundling control component 216 of FIG. 2 and/or response production component 920 can be substantially similar to response production component 212 of FIG. 2. Uplink bundling control component 918 can manage whether bundling of a plurality of TTIs is to be employed by access terminal(s) 904 when sending scheduled transmission(s) responsive to grant(s) included in random access response(s) yielded by response production component 920. For instance, uplink bundling control component 918 can control use of TTI bundling on a per network basis, per base station basis, or per access terminal basis. Moreover, although not shown, it is contemplated that base station 902 can further include a contention resolution component, which can be substantially similar to contention resolution component 214 of FIG. 2. Base station 902 can further include a modulator 922. Modulator 922 can multiplex a frame for transmission by a transmitter 924 through antennas 908 to access terminal(s) 904 in accordance with the aforementioned description. Although depicted as being separate from the processor 914, it is to be appreciated that uplink bundling control component 918, response production component 920, and/or modulator 922 can be part of processor 914 or a number of processors (not shown).

Figure 10:
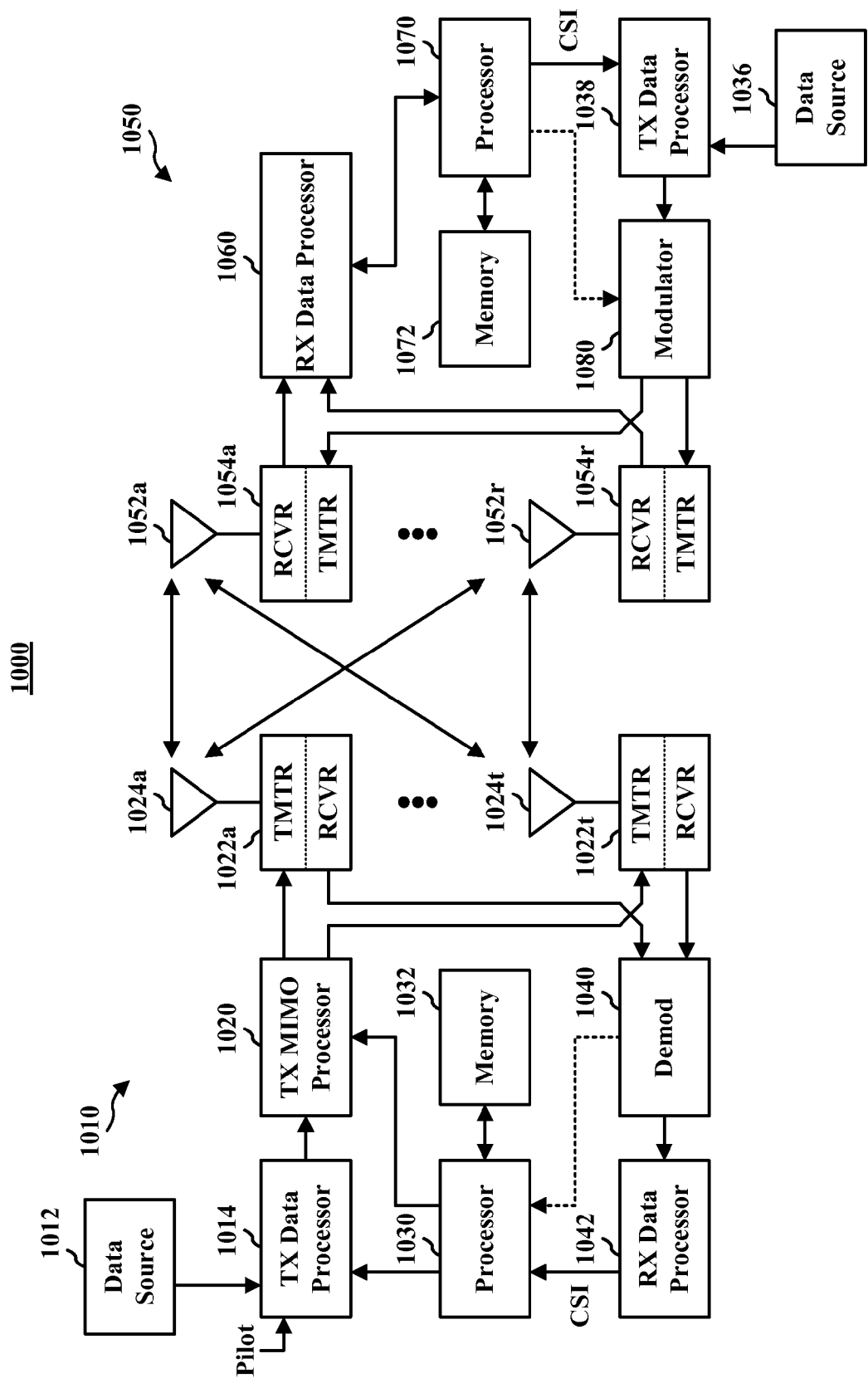
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-2, 8-9, and 11-12) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
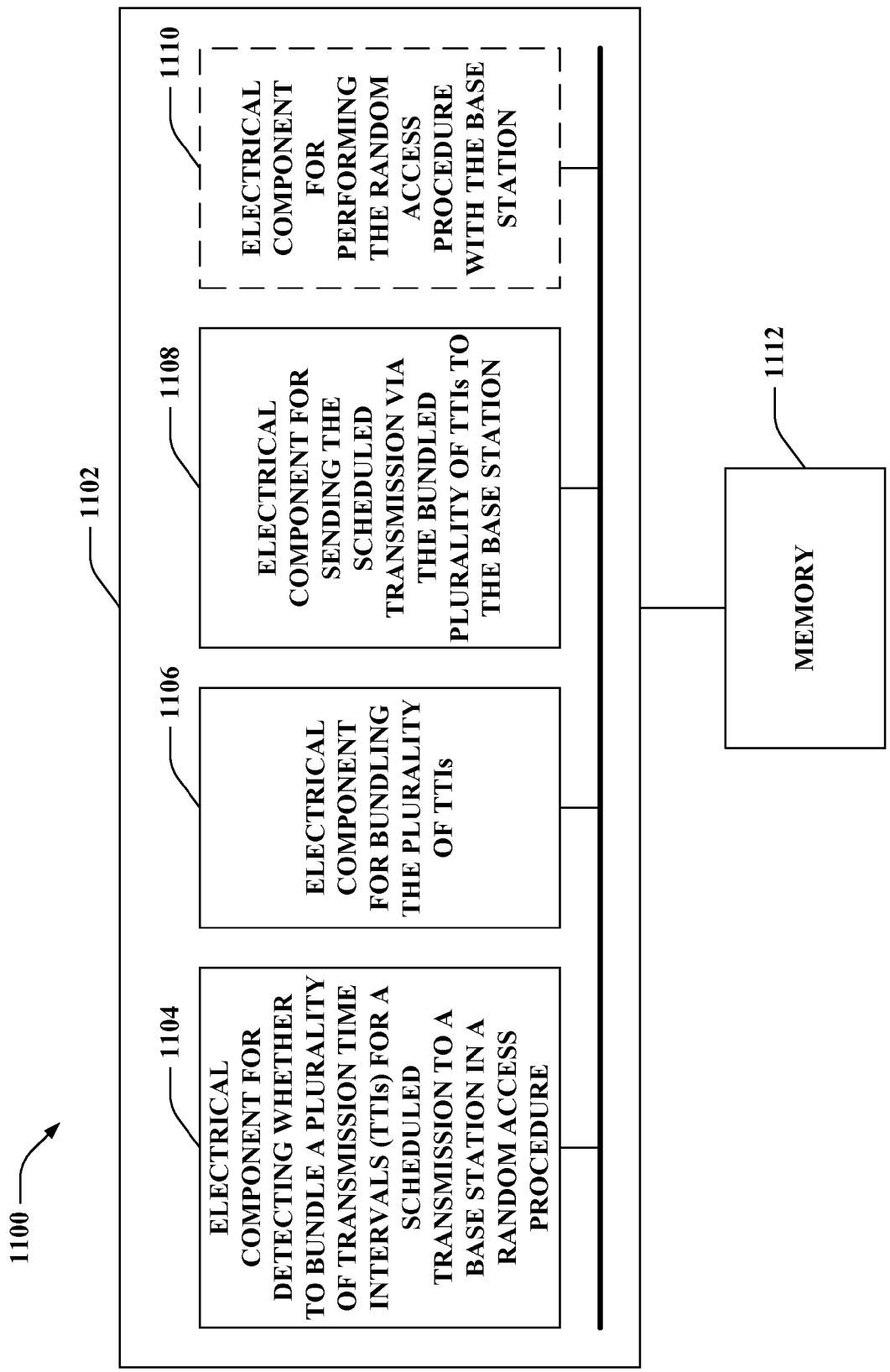
FIG. 11 is an illustration of an example system that enables performing random access in a wireless communication environment.

With reference to FIG. 11, illustrated is a system 1100 that enables performing random access in a wireless communication environment. For example, system 1100 can reside within an access terminal. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for detecting whether to bundle a plurality of Transmission Time Intervals (TTIs) for a scheduled transmission to a base station in a random access procedure 1104. Moreover, logical grouping 1102 can include an electrical component for bundling the plurality of TTIs 1106. For instance, the plurality of TTIs can selectively be bundled. Further, logical grouping 1102 can include an electrical component for sending the scheduled transmission via the bundled plurality of TTIs to the base station 1108. Logical grouping 1102 can also optionally include an electrical component for performing the random access procedure with the base station 1110. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

Figure 12:
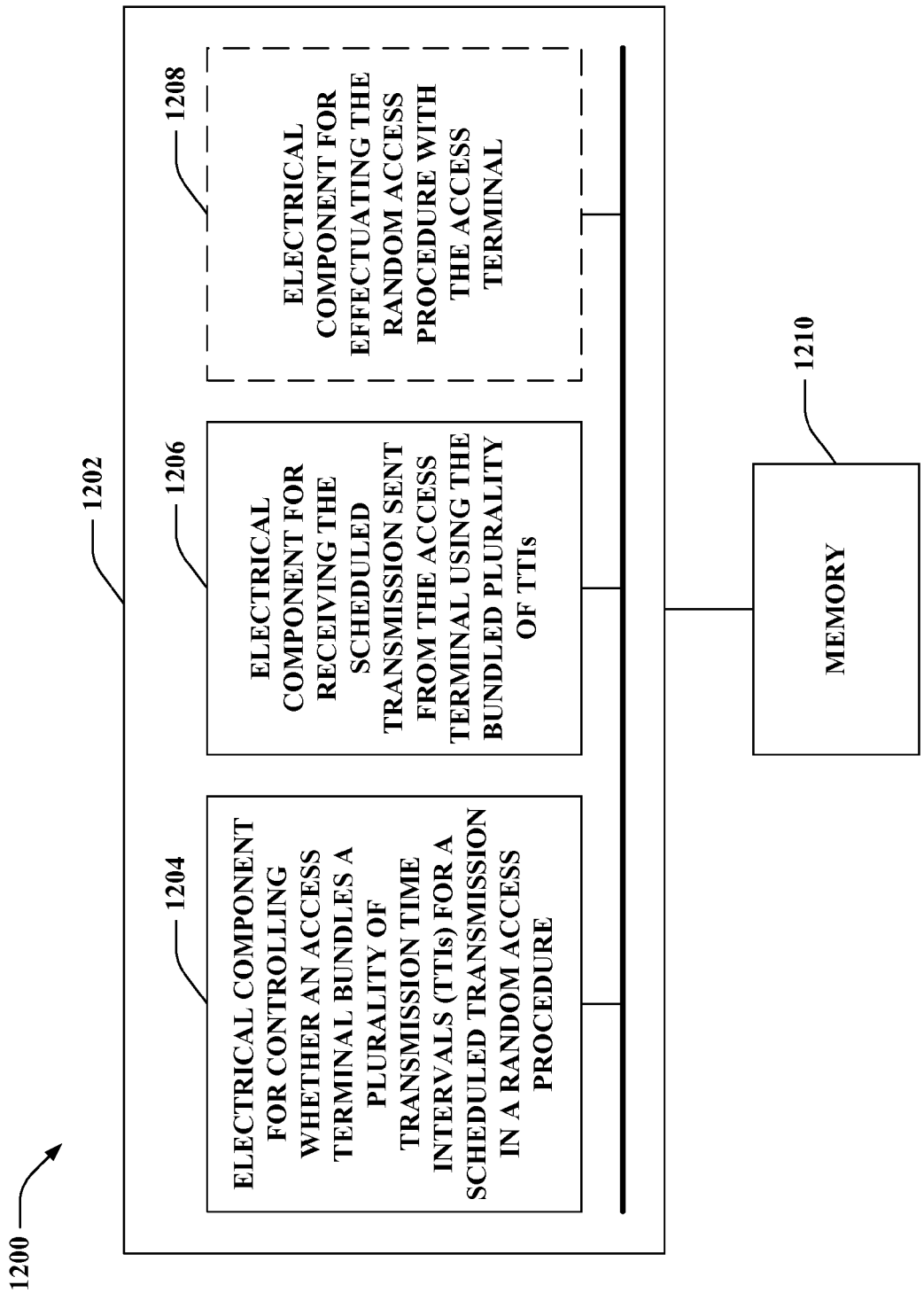
FIG. 12 is an illustration of an example system that enables managing random access in a wireless communication environment.

With reference to FIG. 12, illustrated is a system 1200 that enables managing random access in a wireless communication environment. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for controlling whether an access terminal bundles a plurality of Transmission Time Intervals (TTIs) for a scheduled transmission in a random access procedure 1204. Moreover, logical grouping 1202 can include an electrical component for receiving the scheduled transmission sent from the access terminal using the bundled plurality of TTIs 1206. Logical grouping 1202 can further optionally include an electrical component for effectuating the random access procedure with the access terminal 1208. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates performing random access in a wireless communication environment, comprising:
    transmitting a random access preamble to a base station;
    receiving a random access response from the base station in response to the random access preamble, the random access response having an indicator that indicates whether to bundle a plurality of Transmission Time Intervals (TTIs) for a scheduled transmission;
    determining whether to bundle the plurality of TTIs for the scheduled transmission based upon the indicator included in the random access response and an uplink bandwidth;
    selectively bundling the plurality of TTIs for the scheduled transmission when a determination is made that the uplink bandwidth is less than a threshold value; and
    transmitting a payload of the scheduled transmission to the base station within a common Transport Block (TB) using the bundled plurality of TTIs.

2. The method of claim 1, further comprising determining not to employ bundling of the plurality of TTIs when the uplink bandwidth is greater than the threshold value.

3. The method of claim 1, further comprising:
    receiving a broadcast message that includes a second indicator that distinguishes whether to bundle the plurality of TTIs; and
    recognizing whether to bundle the plurality of TTIs based upon the second indicator included in the broadcast message.

4. The method of claim 1, wherein the payload of the scheduled transmission includes information related to a Radio Resource Control (RRC) connection request and a Non-Access Stratum (NAS) protocol data unit (PDU).

5. The method of claim 1, wherein the payload of the scheduled transmission includes information related to a Message Authentication Code Integrity (MAC-I) for a Radio Resource Control (RRC) connection reestablishment message.

6. The method of claim 1, wherein the bundling includes bundling the plurality of TTIs in a frequency division duplex (FDD) system.

7. The method of claim 1, wherein the bundling includes bundling the plurality of TTIs in a time division duplex (TDD) system that employs configuration 0, configuration 1, or configuration 6.

8. A wireless communications apparatus, comprising:
    a memory that retains instructions related to sending a random access preamble to a base station, obtaining a random access response from the base station in response to the random access preamble, the random access response having an indicator that indicates whether to bundle a plurality of Transmission Time Intervals (TTIs) for a scheduled transmission, determining whether to bundle the plurality of TTIs for the scheduled transmission based upon the indicator included in the random access response and an uplink bandwidth, selectively bundling the plurality of TTIs for the scheduled transmission when a determination is made that the uplink bandwidth is less than a threshold value, and sending the scheduled transmission to the base station utilizing the bundled plurality of TTIs; and
    a processor, coupled to the memory, configured to execute the instructions retained in the memory.

9. The wireless communications apparatus of claim 8, wherein TTI bundling is implemented across a network.

10. The wireless communications apparatus of claim 8, wherein the memory further retains instructions related to identifying whether to bundle the plurality of TTIs based upon a second indicator received via a broadcast message from the base station.

11. The wireless communications apparatus of claim 8, wherein the scheduled transmission includes information related to a Radio Resource Control (RRC) connection request and a Non-Access Stratum (NAS) protocol data unit (PDU).

12. The wireless communications apparatus of claim 8, wherein the scheduled transmission includes information related to a Message Authentication Code Integrity (MAC-I) for a Radio Resource Control (RRC) connection reestablishment message.

13. The wireless communications apparatus of claim 8, wherein the memory further retains instructions related to bundling the plurality of TTIs in a frequency division duplex (FDD) system or a time division duplex (TDD) system that utilizes configuration 0, configuration 1, or configuration 6.

14. A wireless communications apparatus that enables performing random access in a wireless communication environment, comprising:
    means for determining whether to bundle a plurality of Transmission Time Intervals (TTIs) for a scheduled transmission to a base station in a random access procedure based upon an indicator included in a random access response and an uplink bandwidth;
    means for selectively bundling the plurality of TTIs for the scheduled transmission when a determination is made that the uplink bandwidth is less than a threshold value; and
    means for sending the scheduled transmission via the bundled plurality of TTIs to the base station.

15. The wireless communications apparatus of claim 14, further comprising means for performing the random access procedure with the base station.

16. The wireless communications apparatus of claim 14, wherein whether bundling of the plurality of TTIs is supported is controlled per network, per base station, or per access terminal.

17. The wireless communications apparatus of claim 14, wherein the scheduled transmission includes information related to a Radio Resource Control (RRC) connection request and a Non-Access Stratum (NAS) protocol data unit (PDU).

18. The wireless communications apparatus of claim 14, wherein the scheduled transmission includes information related to a Message Authentication Code Integrity (MAC-I) for a Radio Resource Control (RRC) connection reestablishment message.

19. A computer program product, comprising:
    a non-transitory computer-readable medium comprising:
        code for transmitting a random access preamble to a base station:
        code for receiving a random access response from the base station in response to the random access preamble, the random access response having an indicator that indicates whether to bundle a plurality of Transmission Time Interval (TTIs) for a scheduled transmission;
        code for determining whether to bundle the plurality of for the scheduled transmission based upon the indicator included in the random access response and an uplink bandwidth;

code for selectively bundling the plurality of TTIs for the scheduled transmission when a determination is made that the uplink bandwidth is less than a threshold value; and code for transmitting a payload of the scheduled transmission to the base station within a common Transport Block (TB) utilizing the bundled plurality of TTIs.

20. The computer program product of claim 19, wherein TTI bundling is implemented across a network.

21. The computer program product of claim 19, wherein the computer-readable medium further includes code for detecting whether to bundle the plurality of TTIs for the scheduled transmission based upon a second indicator included in a received broadcast message.

22. A wireless communications apparatus, comprising:
a processor configured to:
send a random access preamble to a base station:
obtain a random access response from the base station in response to the random access preamble, the random access response having an indicator that indicates whether to bundle a plurality of Transmission Time Intervals (TTIs) for a scheduled transmission;
determining whether to bundle the plurality of TTIs for the scheduled transmission based upon the indicator included in the random access response and an uplink bandwidth;
selectively bundle the plurality of TTIs for the scheduled transmission when a determination is made that the uplink bandwidth is less than a threshold value;
send the scheduled transmission to the base station within a common Transport Block (TB) utilizing the bundled plurality of TTIs; and
obtain a contention resolution message from the base station in response to the scheduled transmission.

23. A method that facilitates effectuating a random access procedure in a wireless communication environment, comprising:
receiving a random access preamble from an access terminal;
generating a random access response based upon the random access preamble that includes an indicator controlling whether the access terminal bundles a plurality of Transmission Time Intervals (TTIs) for use in connection with a scheduled transmission;
transmitting the random access response to the access terminal; and
receiving the scheduled transmission sent from the access terminal using the bundled plurality of TTIs when a determination is made by the access terminal that an uplink bandwidth is less than a threshold value.

24. The method of claim 23, further comprising transmitting a broadcast message that includes a second indicator that manages whether TTI bundling is employed.

25. The method of claim 23, wherein the scheduled transmission sent using the bundled plurality of TTIs includes information related to a Radio Resource Control (RRC) connection request and a Non-Access Stratum (NAS) protocol data unit (PDU).

26. The method of claim 25, further comprising transmitting an initial access terminal message to a Mobility Management Entity (MME) based upon the NAS PDU prior to receipt of a subsequent uplink message after the scheduled transmission from the access terminal.

27. The method of claim 23, wherein the scheduled transmission sent using the bundled plurality of TTIs includes information related to a Message Authentication Code Integrity (MAC-I) for a Radio Resource Control (RRC) connection reestablishment message.

28. A wireless communications apparatus, comprising:
a memory that retains instructions related to receiving a random access preamble from an access terminal, generating a random access response based upon the random access preamble that includes an indicator controlling whether the access terminal bundles a plurality of Transmission Time Intervals (TTIs) for use in connection with a scheduled transmission, transmitting the random access response to the access terminal, and receiving the scheduled transmission sent from the access terminal using the bundled plurality of TTIs when a determination is made by the access terminal that an uplink bandwidth is less than a threshold value; and
a processor, coupled to the memory, configured to execute the instructions retained in the memory.

29. The wireless communications apparatus of claim 28, wherein the scheduled transmission sent using the bundled plurality of TTIs includes information related to a Radio Resource Control (RRC) connection request and a Non-Access Stratum (NAS) protocol data unit (PDU).

30. The wireless communications apparatus of claim 28, wherein the scheduled transmission sent using the bundled plurality of TTIs includes information related to a Message Authentication Code Integrity (MAC-I) for a Radio Resource Control (RRC) connection reestablishment message.

31. A wireless communications apparatus that enables managing random access in a wireless communication environment, comprising:
means for controlling whether an access terminal bundles a plurality of Transmission Time Intervals (TTIs) for a scheduled transmission in a random access procedure based in part on transmitting a random access response to the access terminal that includes an indicator controlling whether the access terminal bundles the plurality of TTIs for use in connection with the scheduled transmission; and
means for receiving the scheduled transmission sent from the access terminal using the bundled plurality of TTIs when a determination is made by the access terminal that an uplink bandwidth is less than a threshold value.

32. The wireless communications apparatus of claim 31, wherein the scheduled transmission sent from the access terminal using the bundled plurality of TTIs includes a Radio Resource Control (RRC) connection request with a Non-Access Stratum (NAS) protocol data unit (PDU) or an RRC connection reestablishment message that carries a Message Authentication Code Integrity (MAC-I).

33. A computer program product, comprising:
a non-transitory computer-readable medium comprising:
code for managing whether an access terminal bundles a plurality of Transmission Time Intervals (TTIs) for a scheduled transmission in a random access procedure based in part on transmitting a random access response to the access terminal that includes an indicator controlling whether the access terminal bundles the plurality of TTIs for use in connection with the scheduled transmission; and
code for obtaining the scheduled transmission sent from the access terminal using the bundled plurality of TTIs when a determination is made by the access terminal that an uplink bandwidth is less than a threshold value.

34. The computer program product of claim 33, wherein the computer-readable medium further includes code for performing the random access procedure with the access terminal.

35. The computer program product of claim 33, wherein the scheduled transmission sent from the access terminal using the bundled plurality of TTIs includes a Radio Resource Control (RRC) connection request with a Non-Access Stratum (NAS) protocol data unit (PDU) or an RRC connection reestablishment message that carries a Message Authentication Code Integrity (MAC-I).

36. A wireless communications apparatus, comprising:
a processor configured to:
receive a random access preamble from an access terminal;
generate a random access response based upon the random access preamble;
transmit the random access response to the access terminal;
control whether the access terminal bundles a plurality of Transmission Time Intervals (TTIs) for a scheduled transmission at least in part by including an indicator in the random access response; and
receive the scheduled transmission sent from the access terminal using the bundled plurality of TTIs when a determination is made by the access terminal that an uplink bandwidth is less than a threshold value.

37. The wireless communications apparatus of claim 22, wherein the processor is configured to recognize whether to bundle the plurality of TTIs based further on a receiving a broadcast message including a second indicator specifying whether to bundle the plurality of TTIs.

38. The wireless communications apparatus of claim 22, wherein the scheduled transmission includes information related to a Radio Resource Control (RRC) connection request and a Non-Access Stratum (NAS) protocol data unit (PDU) or information related to a Message Authentication Code Integrity (MAC-I) for a RRC connection reestablishment message.

39. The wireless communications apparatus of claim 28, wherein the memory further retains instructions related to transmitting a broadcast message that includes a second indicator that manages whether TTI bundling is employed.

40. The wireless communications apparatus of claim 36, wherein the scheduled transmission includes a Radio Resource Control (RRC) connection request with a Non-Access Stratum (NAS) protocol data unit (PDU) or an RRC connection reestablishment message that carries a Message Authentication Code Integrity (MAC-I).

41. The method of claim 1, wherein a size of the payload is larger than a TB size for one of the plurality of TTIs.

42. The method of claim 1, wherein the indication comprises a 1-bit ON/OFF indication included in the random access response.

\* \* \* \* \*